United States Patent
Kuo et al.

(10) Patent No.: US 8,134,540 B2
(45) Date of Patent: Mar. 13, 2012

(54) TOUCH PANEL AND LIQUID CRYSTAL DISPLAY PANEL

(75) Inventors: Chien-Chung Kuo, Taichung County (TW); Wen-Chun Wang, Taichung (TW)

(73) Assignee: Wintek Corporation, Taichung (TW)

(*) Notice: Subject to any disclaimer, the term of this patent is extended or adjusted under 35 U.S.C. 154(b) by 772 days.

(21) Appl. No.: 12/242,889

(22) Filed: Sep. 30, 2008

(65) Prior Publication Data

US 2009/0096765 A1 Apr. 16, 2009

(30) Foreign Application Priority Data

Oct. 16, 2007 (TW) ................................ 96138670 A
Nov. 20, 2007 (CN) ........................... 2007 1 0186694

(51) Int. Cl.
G06F 3/45 (2006.01)
G02F 1/1335 (2006.01)

(52) U.S. Cl. ...................... 345/174; 349/106

(58) Field of Classification Search ................ 345/48, 345/87, 102, 104, 207, 173–175; 349/12, 349/42, 43, 48, 106; 313/486, 493, 586
See application file for complete search history.

(56) References Cited

U.S. PATENT DOCUMENTS

| | | | |
|---|---|---|---|
| 4,738,515 A * | 4/1988 | Okada et al. | 349/133 |
| 5,302,537 A * | 4/1994 | Strack | 438/268 |
| 5,579,036 A | 11/1996 | Yates, IV | |
| 5,617,436 A * | 4/1997 | Lo | 372/45.011 |
| 5,631,805 A | 5/1997 | Bonsall | |
| 5,657,054 A * | 8/1997 | Files et al. | 345/177 |
| 6,628,355 B1 * | 9/2003 | Takahara | 349/106 |
| 6,777,309 B1 * | 8/2004 | Liao et al. | 438/458 |
| 6,914,640 B2 | 7/2005 | Yu | |
| 6,947,615 B2 * | 9/2005 | Deliwala | 385/5 |
| 7,053,968 B2 | 5/2006 | Hong et al. | |
| 7,084,933 B2 | 8/2006 | Oh et al. | |
| 7,259,804 B2 | 8/2007 | Yu et al. | |
| 7,791,782 B2 * | 9/2010 | Paolini et al. | 359/245 |
| 2005/0219435 A1 * | 10/2005 | Oh et al. | 349/43 |
| 2005/0243023 A1 * | 11/2005 | Reddy et al. | 345/48 |
| 2006/0054939 A1 * | 3/2006 | Hsu et al. | 257/234 |

(Continued)

FOREIGN PATENT DOCUMENTS

TW 556140 10/2003

(Continued)

OTHER PUBLICATIONS

"First Office Action of China Counterpart Application", issued on Nov. 27, 2009, p. 1-p. 5, in which Ref.1 was cited.

(Continued)

Primary Examiner — Prabodh M Dharia
(74) Attorney, Agent, or Firm — Jianq Chyun IP Office (57) ABSTRACT

A touch panel having a color-filtering function is provided. The touch panel includes a first electrode layer, a second electrode layer, a first dielectric layer and a second dielectric layer. The second electrode layer is disposed above the first electrode layer. The first dielectric layer is disposed between the first electrode layer and the second electrode layer, while the second dielectric layer is disposed on the second electrode layer. Further, the second electrode layer is located between the first dielectric layer and the second dielectric layer. Here, either the first dielectric layer or the second dielectric layer is a color filter layer. A liquid crystal display panel using the above touch panel as a color filter is also provided.

23 Claims, 6 Drawing Sheets

U.S. PATENT DOCUMENTS

| | | | |
|---|---|---|---|
| 2006/0292757 A1* | 12/2006 | Wu et al. | 438/149 |
| 2007/0222762 A1* | 9/2007 | Van Delden et al. | 345/173 |
| 2007/0258247 A1* | 11/2007 | Park et al. | 362/326 |
| 2007/0268243 A1* | 11/2007 | Choo et al. | 345/104 |
| 2008/0090323 A1* | 4/2008 | Wu | 438/70 |
| 2008/0100905 A1* | 5/2008 | Kato et al. | 359/295 |

FOREIGN PATENT DOCUMENTS

| | | |
|---|---|---|
| TW | I222036 | 10/2004 |
| TW | I258029 | 7/2006 |
| TW | I278690 | 4/2007 |
| WO | 2006054585 | 5/2006 |

OTHER PUBLICATIONS

"Office Action of Taiwan Counterpart Application", issued on Aug. 4, 2011, p. 1-p. 4, in which Ref.2 to Ref.8 were cited.

* cited by examiner

TOUCH PANEL AND LIQUID CRYSTAL DISPLAY PANEL

CROSS-REFERENCE TO RELATED APPLICATION

This application claims the priority benefit of Taiwan and China patent applications serial no. 96138670 and 200710186694.2, filed on Oct. 16, 2007 and Nov. 20, 2007. The entirety of each of the above-mentioned patent applications is hereby incorporated by reference herein and made a part of this specification.

BACKGROUND OF THE INVENTION

1. Field of the Invention

The present invention relates to a touch panel and a liquid crystal display (LCD) panel, and more particularly to a touch panel having a color-filtering function and a color LCD panel having a touch-control function.

2. Description of Related Art

In the current information era, the reliance on electronic products is increasing. The electronic products including mobile phones, handheld personal computers (PCs), personal digital assistants (PDAs) and smart phones have pervaded everywhere in our daily life. Some of the electronic products may integrate touch panels into display panels, so as to result in a formation of a color touch display panel and enable users to see relatively large display frames and operate the device in a simple operation mode when considering restricted volumes of the miniature electronic products.

Figure 1:
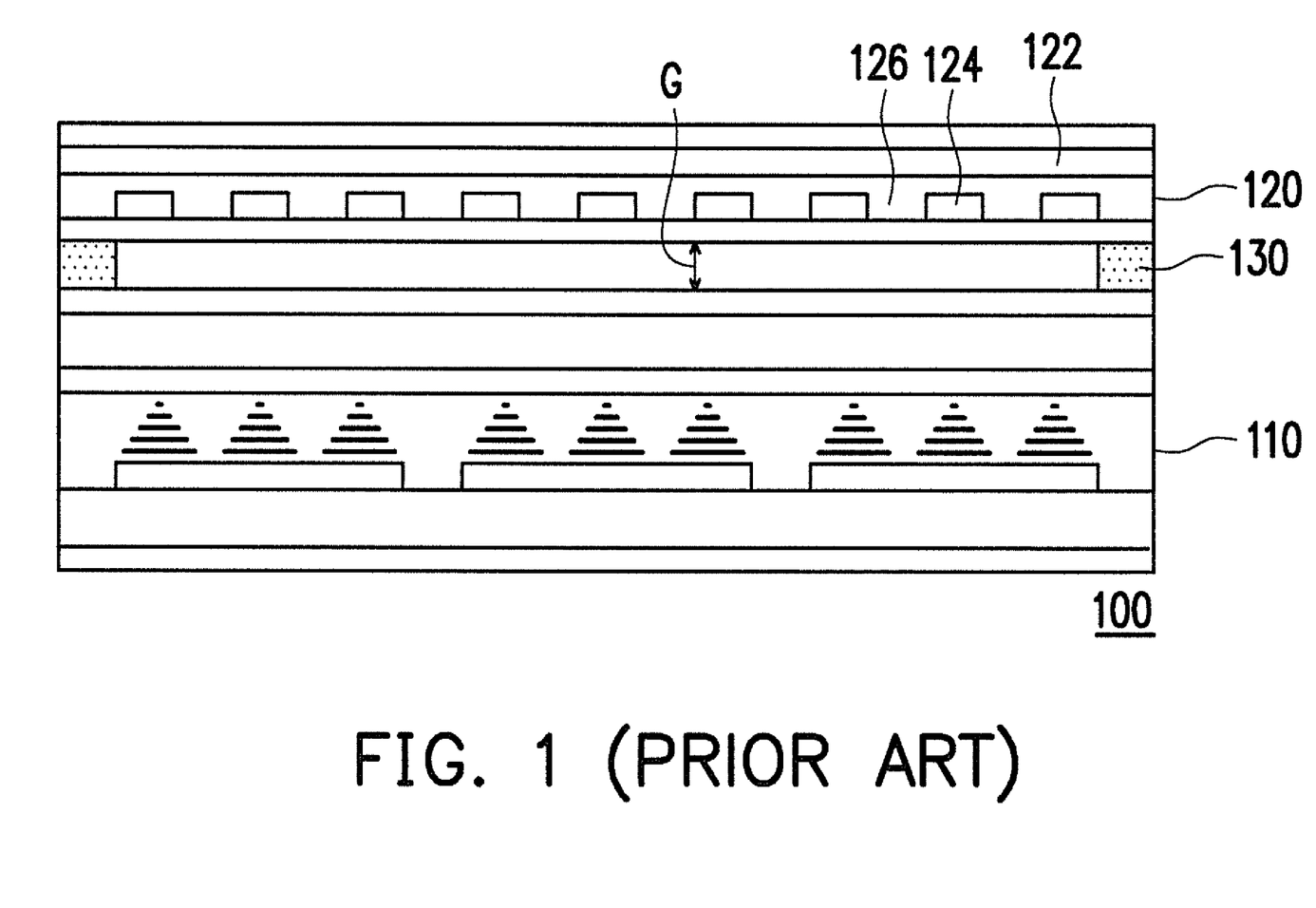
FIG. 1 illustrates a conventional color touch display panel.

FIG. 1 illustrates a conventional color touch display panel. Referring to FIG. 1, a color touch display panel 100 includes a display panel 110 and a touch panel 120 bonding to the display panel 110 through a double-sided tape 130. The display panel 110 is, for example, a flat display panel, such as an LCD panel which can achieve a color display effect, an organic light emitting display (OLED) panel, and so on. The touch panel 120 is a digital capacitance touch panel including a plurality of stripe upper electrodes 122, a plurality of stripe lower electrodes 124, and a dielectric layer 126 disposed between the upper electrodes 122 and the lower electrodes 124. As the touch panel 120 is adhered to the display panel 110 through the double-sided tape 130, the color touch display panel 100 is characterized by the touch-control function and the color display function. Nevertheless, the double-sided tape 130 is merely attached to edges of the display panel 110 and the touch panel 120, such that a gap G exists between the touch panel 120 and the display panel 110. Due to the difference in refraction index of media, as the light passes through the gap G, the display quality is worsened because of light leakage of the display panel 110 or a reduction of light transmittance. Besides, the touch panel 120 and the display panel 110 adhered to each other results in an unlikelihood of reducing the thickness of the color touch display panel 100, such that the market demand on miniature electronic products cannot be satisfied.

Figure 2:
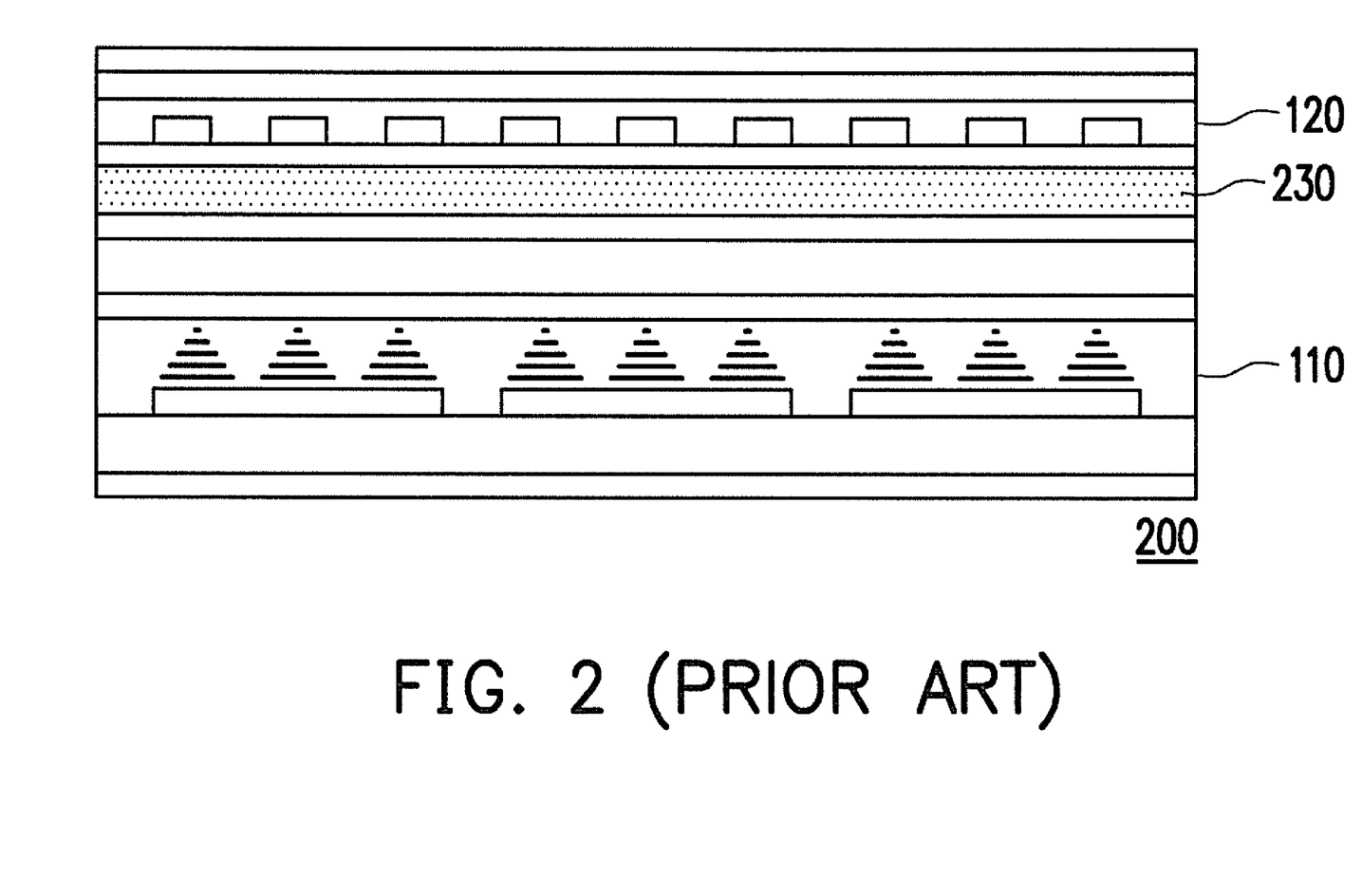
FIG. 2 illustrates another conventional color touch display panel.

On the other hand, FIG. 2 illustrates another conventional color touch display panel. Referring to FIG. 2, a color touch display panel 200 is similar to the color touch display panel 100, while the difference therebetween lies in that the touch panel 120 is adhered to the display panel 110 through an optical glue 230 in the color touch display panel 200. An area between the display panel 110 and the touch panel 120 is completely coated by the optical glue 230. Thus, it is rather unlikely for the color touch display panel 200 to have light leakage, and thus the color touch display panel 200 is characterized by a favorable display quality. Unfortunately, the optical glue 230 requires higher costs, and the thickness of the color touch display panel 200 stays unchanged. Furthermore, the reliability of the optical glue 230 is reduced after the optical glue 230 is used for a long period of time. Based on the above, the conventional color touch display panel is neither capable of catering to the trend of compactness and lightness required by the miniature electronic products nor able to achieve a desirable display quality of the touch-control display panel.

SUMMARY OF THE INVENTION

The present invention is directed to a touch panel having a color-filtering function, such that it is not necessary for the touch panel in a color touch display panel to be additionally adhered to a color display panel.

The present invention is further directed to an LCD panel equipped with a color display function and a touch-control function.

The present invention provides a touch panel having a color-filtering function. The touch panel includes a first electrode layer, a second electrode layer, a first dielectric layer and a second dielectric layer. The second electrode layer is disposed above the first electrode layer. The first dielectric layer is disposed between the first electrode layer and the second electrode layer, and the second dielectric layer is disposed on the second electrode layer. Further, the second electrode layer is located between the first dielectric layer and the second dielectric layer. Here, either the first dielectric layer or the second dielectric layer is a color filter layer.

The present invention further provides an LCD panel including a first substrate, a second substrate, and a liquid crystal layer. The first substrate includes, a first electrode layer, a second electrode layer, a first dielectric layer, a second dielectric layer, and a third electrode layer. The second electrode layer is disposed above the first electrode layer. The first dielectric layer is disposed between the first electrode layer and the second electrode layer, and the second dielectric layer is disposed on the second electrode layer. Further, the second electrode layer is located between the first dielectric layer and the second dielectric layer. Here, either the first dielectric layer or the second dielectric layer is a color filter layer. The third electrode layer completely covers the second dielectric layer. The second substrate is parallel to the first substrate, and the liquid crystal layer is disposed between the second substrate and the third electrode layer of the first substrate.

According to an embodiment of the present invention, the first electrode layer includes a plurality of first stripe electrode patterns arranged in parallel. In addition, the second electrode layer includes a plurality of second stripe electrode patterns. The second stripe electrode patterns are arranged in parallel, for example, and a direction in which the second stripe electrode patterns are arranged is substantially perpendicular to a direction in which the first stripe electrode patterns are arranged.

According to an embodiment of the present invention, the touch panel and the liquid crystal display panel further comprise a substrate, wherein the first electrode layer is disposed on the substrate. The color filter layer includes a plurality of color filter films and a black matrix defining a plurality of sub-pixel areas on the substrate. Each of the color filter films is located within one of the sub-pixel areas. In addition, an overlapping area between the first electrode layer and the second electrode layer covers two or more sub-pixel areas. Specifically, the color filter films include red filter films, green filter films or blue filter films.

According to an embodiment of the present invention, the touch panel and the liquid crystal display panel further include a passivation layer disposed between the second electrode layer and the second dielectric layer. Besides, the touch panel further includes a grounding conductive layer disposed between the passivation layer and the second dielectric layer, for example.

According to an embodiment of the present invention, the touch panel and the liquid crystal display panel further include a planar layer disposed on a surface of the color filter layer. Said surface is away from the first electrode layer.

According to an embodiment of the present invention, a material of the first electrode layer, the second electrode layer, and the third electrode layer includes a transparent conductive material comprising indium tin oxide (ITO) or indium zinc oxide (IZO).

According to an embodiment of the present invention, a thickness of the color filter layer ranges from 0.2 µm to 4 µm.

According to an embodiment of the present invention, the second substrate of the liquid crystal display panel includes an active device array structure.

According to an embodiment of the present invention, the first dielectric layer comprises a glass substrate or a plastic substrate.

According to an embodiment of the present invention, the touch panel and the liquid crystal display panel further comprise an optical lens disposed on a surface of the first electrode layer, wherein the surface is away from the first dielectric layer.

In the present invention, the color filter layer and the touch panel are integrated onto the same substrate, such that the touch panel of the present invention is equipped with the color-filtering function. Additionally, the LCD panel of the present invention is not only able to achieve the color display effect, but also capable of performing the touch-control function. Moreover, the LCD panel of the present invention is in a thickness less than that of the color display panel having the touch-control function according to the related art.

In order to the make the aforementioned and other objects, features and advantages of the present invention comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 3:
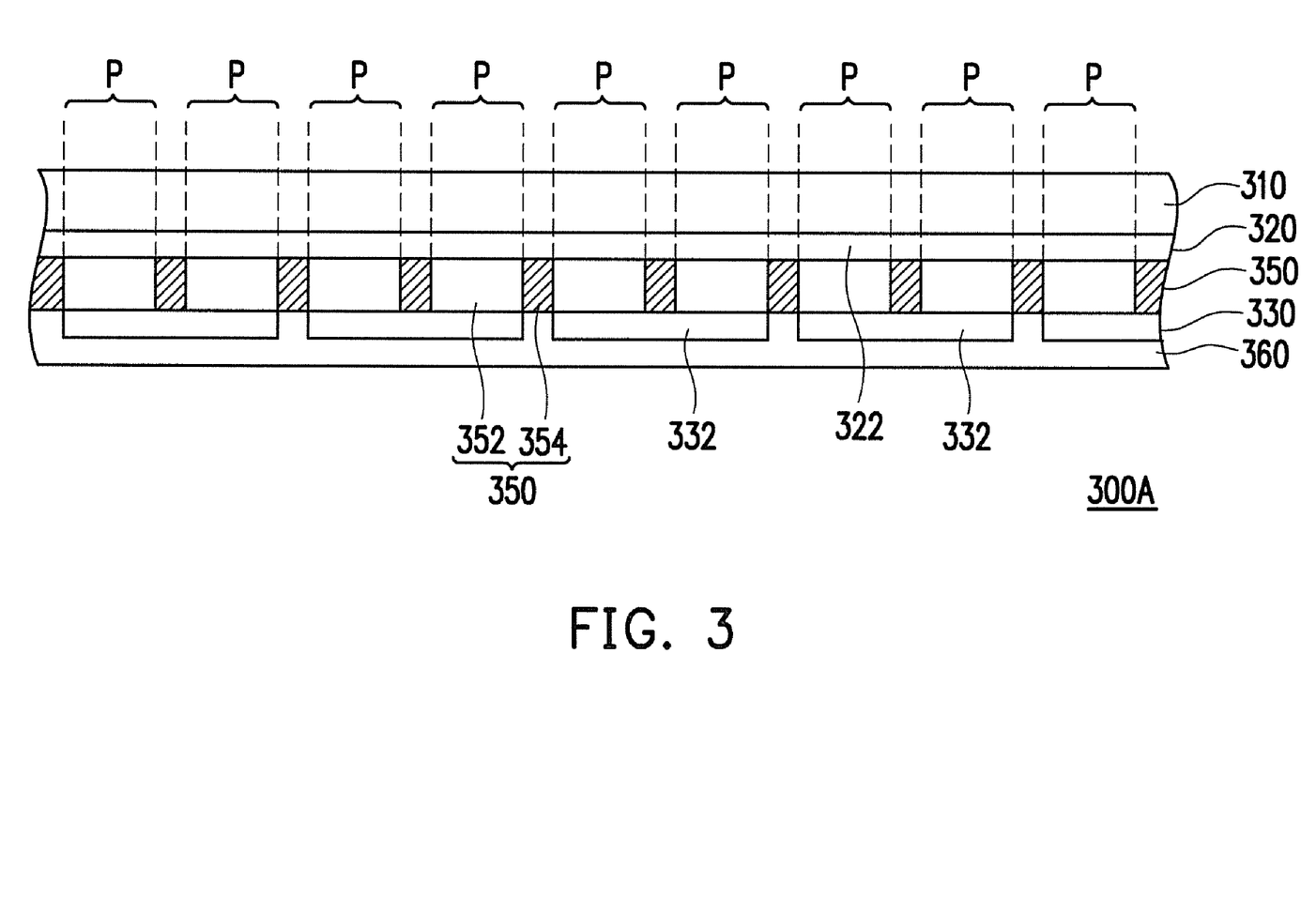
FIG. 3 is a schematic view of a touch panel according to a first embodiment of the present invention.

FIG. 3 is a schematic view of a touch panel according to a first embodiment of the present invention. Referring to FIG. 3, a touch panel 300A includes a substrate 310, a first electrode layer 320, a second electrode layer 330, a first dielectric layer (350) and a second dielectric layer 360. Here, the first dielectric layer (350) is a color filter layer 350, for example. The first electrode layer 320 is disposed on the substrate 310, while the second electrode layer 330 is disposed above the first electrode layer 320. The color filter layer 350 is disposed between the first electrode layer 320 and the second electrode layer 330, whereas the second dielectric layer 360 is disposed on the second electrode layer 330. The second electrode layer 330 is disposed between the color filter layer 350 and the second dielectric layer 360.

In the present embodiment, a thickness of the first dielectric layer, i.e., the color filter layer 350, poses an impact on a filtering effect of the touch panel 300A and on capacitance between the first electrode layer 320 and the second electrode layer 330. Hence, the thickness of the color filter layer 350 ranges from 0.2 µm to 4 µm, for example. In general, the thickness of the color filter layer 350 employed by the display panel is approximately in a range of 0.8 µm~1.2 µm, so as to achieve favorable filtering performance. On the other hand, the second dielectric layer 360 is made of dielectric materials including polyimide, silicon oxide, silicon nitride, silicon oxynitride, or acrylic resin, for example.

The touch panel 300A is, for example, a capacitive touch panel. In particular, the first electrode layer 320 includes a plurality of first stripe electrode patterns 322 arranged in parallel. In addition, the second electrode layer 330 includes a plurality of second stripe electrode patterns 332. The second stripe electrode patterns 332 are arranged in parallel, for example, and a direction in which the second stripe electrode patterns 332 are arranged is substantially perpendicular to a direction in which the first stripe electrode patterns 322 are arranged. That is to say, the first stripe electrode patterns 322 are parallel to the direction of the drawing, while the second stripe electrode patterns 332 are perpendicular to the direction of the drawing, for example. When a user touches an overlapping area between the first stripe electrode patterns 322 in an $i^{th}$ row in the first electrode layer 320 and the second stripe electrode patterns 322 in a $j^{th}$ line in the second electrode layer 330, the action of touching triggers a production of a signal, e.g., (Xi, Yj), so as to control an electronic product.

On the other hand, the color filter layer 350 includes a plurality of color filter film 352 and a black matrix 354 defining a plurality of sub-pixel areas P on the substrate 310, and each of the color filter films 352 is located within one of the sub-pixel areas P. In addition, the overlapping area between the first electrode layer 320 and the second electrode layer 330 covers two or more sub-pixel areas P. As a matter of fact, the overlapping area between the first electrode layer 320 and the second electrode layer 330 varies upon actual design demands on the resolution of the touch panel 300A. Moreover, in the present embodiment, the first electrode layer 320 and the second electrode layer 330 are not necessarily composed of the plurality of the stripe electrode patterns. A material the first electrode layer 320 and the second electrode layer 330 includes a transparent conductive material comprising ITO or IZO.

Specifically, the color filter films 352 include red filter films, green filter films or blue filter films. However, in other embodiments, the color filter films 352 may have different combinations of colors. In the present embodiment, the color filter layer 350 serves as the first dielectric layer and is integrated into the touch panel 300A, such that the touch panel 300A is equipped with a color filtering function. Thus, when the touch panel 300A is assembled to another substrate, and liquid crystal molecules are filled therebetween, an LCD panel having a touch-control function as illustrated in FIG. 4 is then formed.

Figure 4:
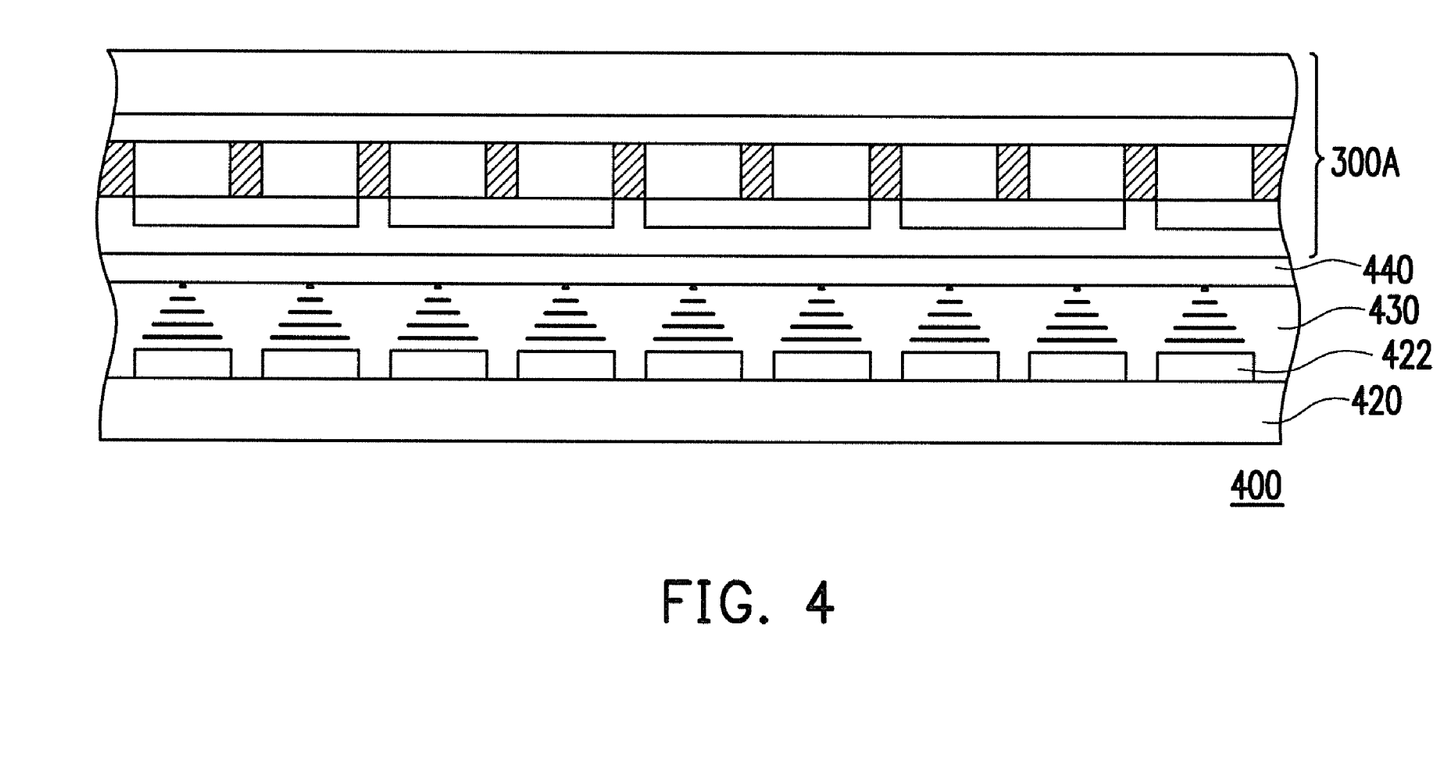
FIG. 4 is a schematic view of an LCD panel having a touch-control function according to an embodiment of the present invention.

Referring to FIG. 4, an LCD panel 400 includes the touch panel 300A depicted in FIG. 3, a second substrate 420, and a liquid crystal layer 430. The touch panel 300A of the present embodiment has the color filtering function, and accordingly the touch panel 300A can serve as a color filter after being assembled to the second substrate 420, such that the LCD panel 400 is able to achieve a color display effect. In other words, the LCD panel 400 is able to perform the touch-control function in no need of adhering the touch panel 300A to the display panel with use of an adhesive (a double-sided tape or optical glue). Accordingly, the touch-control LCD panel 400 is in a thinner thickness, and light leakage due to a gap existing between the touch panel 300A and the LCD panel 400 is not likely to occur in the touch-control LCD panel 400. Besides, an issue regarding a reduction of reliability of the optical glue because of using the optical glue for a long period of time does not take place in the present invention.

A third electrode layer 440 is disposed on the touch panel 300A and serves as a common electrode in the LCD panel 400, for example. A material of the third electrode layer 440 includes a transparent conductive material comprising ITO or IZO. An active device array structure 422 is disposed on the second substrate 420, for example. According to other embodiments, however, the LCD panel 400 may also be designed as a passive LCD panel, such as a super twisted nematic LCD (STN-LCD) panel, a twisted nematic LCD (TN-LCD) panel, and so on.

It is of certainty that the touch panel 300A of the present invention is not limited to be merely applied to the LCD panel. In other embodiments, the touch panel 300A can also be employed in a flat display including an OLED. Thus, the OLED is not only able to achieve the color display effect, but also capable of performing the touch-control function. In other embodiments, the touch panel 300A can be applied to various displays as the color filter.

Figure 5:
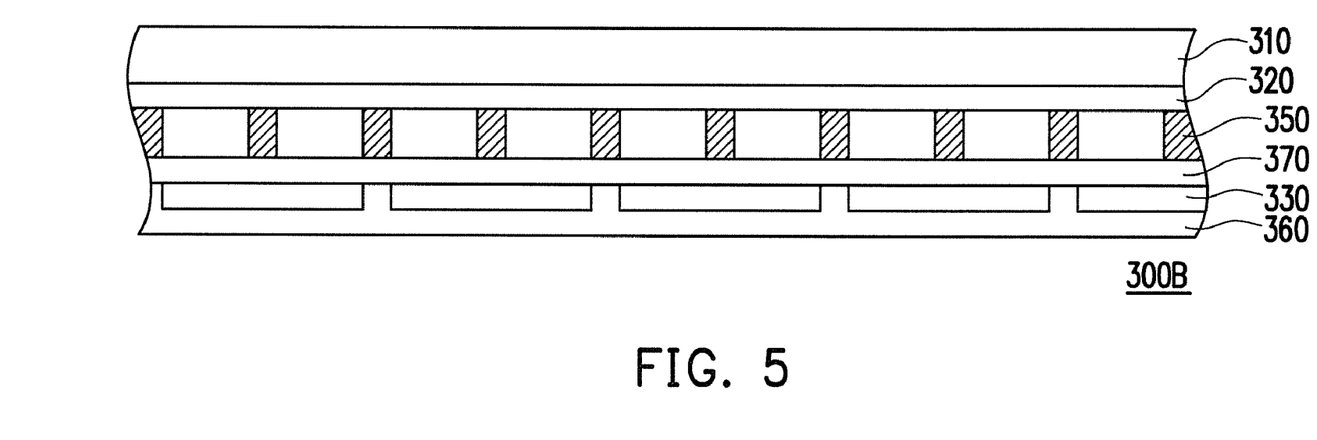
FIGS. 5 and 6 are schematic views of other two touch panels according to the first embodiment of the present invention.

On the other hand, the touch panel of the present invention may denote a touch panel 300B as depicted in FIG. 5. Referring to FIG. 5, in the touch panel 300B, a planar layer 370 is further disposed on the color filter layer 350 of the touch panel 300A. The planar layer 370 ensures desirable planarity of the color filter layer 350, improving the process yield of subsequently fabricating film layers.

Figure 6:
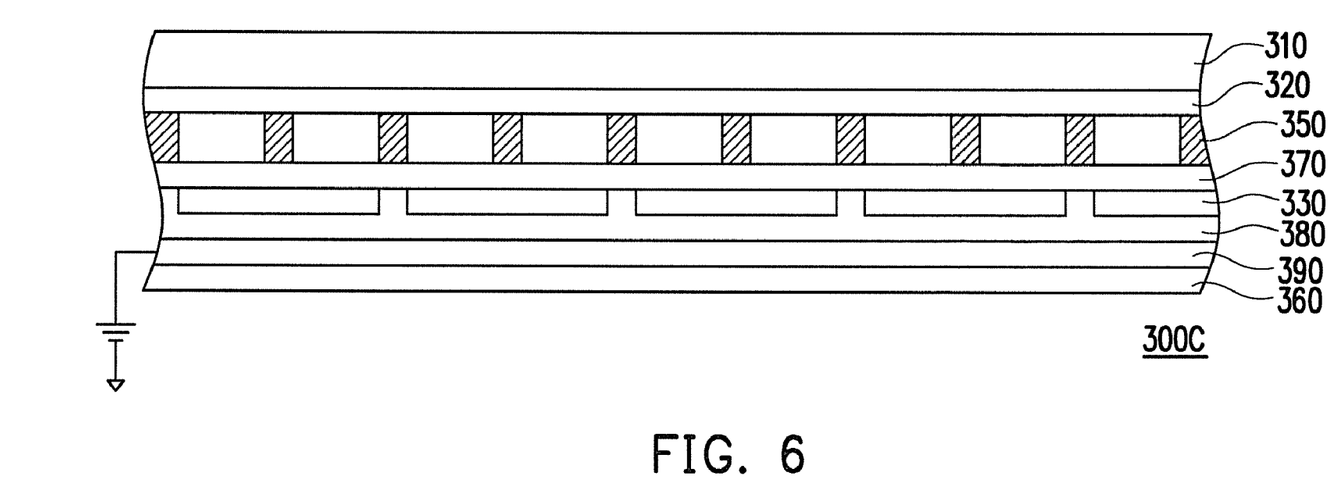

Specifically, referring to FIG. 6, the touch panel of the present invention may be referred to as a touch panel 300C as depicted in FIG. 6. The touch panel 300C further includes a passivation layer 380 disposed between the second electrode layer 330 and the second dielectric layer 360. Besides, the touch panel 300C further includes a grounding conductive layer 390 disposed between the passivation layer 380 and the second dielectric layer 360. When the touch panel 300C is assembled to the second substrate for forming the LCD panel, the disposition of the grounding conductive layer 390 prohibits signals of the second electrode layer 330 and those of the common electrode layer of the LCD panel from interfering with one another, so as to maintain the favorable display quality of the LCD panel.

Second Embodiment

Figure 7:
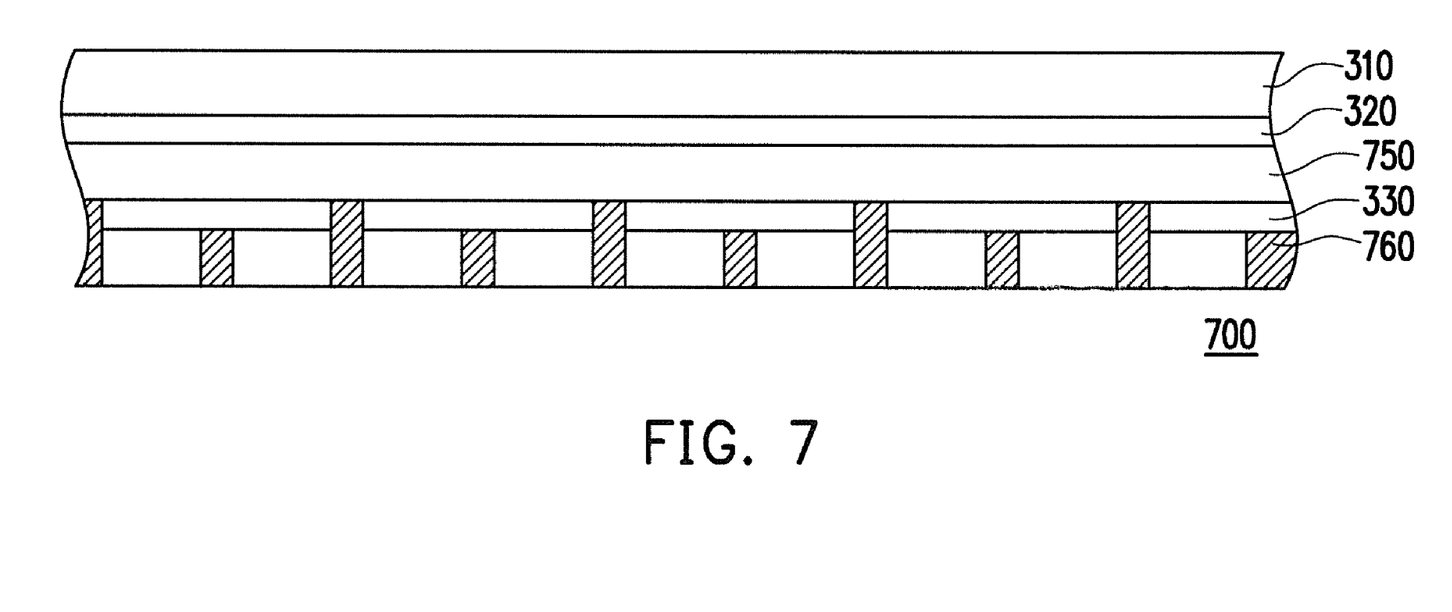
FIG. 7 is a schematic view of a touch panel according to a second embodiment of the present invention.

FIG. 7 is a schematic view of a touch panel according to a second embodiment of the present invention. Referring to FIG. 7, a touch panel 700 is similar to the touch panel 300A, while the difference therebetween lies in that the second dielectric layer of the touch panel 700 is a color filter layer 760, but a first dielectric layer 750 is not a color filter layer. Like the structure of the touch panel 300A, the structure of the touch panel 700 varies in a wide range. For example, a planar layer (not shown) can be further disposed on the color filter layer 760 of the touch panel 700. In an alternative, a grounding conductive layer (not shown) can be formed on the color filter layer 360 of the second dielectric layer, and a third dielectric layer (not shown) can be formed on the grounding conductive layer (not shown). Moreover, the touch panel 700 can further include a passivation layer (not shown) disposed between the second electrode layer 330 and the color filter layer 760.

In another embodiment, the first dielectric layer 750 of the touch panel 700 may be a glass substrate or a plastic substrate. In this case, the touch panel 700 is not necessarily disposed on the substrate 310, and takes the first dielectric layer 750 as a supporting base. In addition, when the first dielectric layer 750 is a glass substrate or a plastic substrate, an optical lens (not shown) is supposed to be disposed on a surface of the first electrode layer 320, wherein the surface is away from the first dielectric layer 750. In another word, the substrate 310 can be replaced by an optical lens (not shown) while the first dielectric layer 750 is a glass substrate or a plastic substrate. As a whole, the integration of the touch panel 700 and the color filter layer 760 gives rise to a significant reduction of the thickness of the touch-control display panel. Besides, in other embodiments, the first dielectric layer of the touch panel and the second dielectric layer thereof can be made up of the color filter layer, so as to enhance color saturation after the light passes through the touch panel and to simultaneously reduce the thickness of the touch panel.

In light of the foregoing, the touch panel of the present invention and the LCD panel thereof at least have the following advantages. The touch panel of the present invention is equipped with the color-filtering function, such that the touch panel of the present invention can be utilized as the color filter. After the touch panel of the present invention is assembled to one active device array substrate, and liquid crystal molecules are filled therebetween, the LCD panel having the touch-control function can be formed. Here, it is not required to bond two panels with different functions together, such that the thickness of the touch-control LCD panel is reduced. Additionally, the display quality of the touch-control LCD panel according to the present invention is not worsened on account of the adhesive or the gap existing between the two panels. In other words, the touch-control LCD panel integrates two panels having different functions together, such that the fabrication of components of the touch-control LCD panel is simplified, and the manufacturing costs are thus reduced. Particularly, the touch panel of the present invention is applicable not only to the LCD panel, but also to other flat display panels requiring the color filters. Thereby, the flat display panels are equipped with the touch-control function and are able to achieve the color display effect at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel having a color-filtering function, the touch panel comprising:
   a first electrode layer;
   a second electrode layer disposed above the first electrode layer;
   a first dielectric layer disposed between the first electrode layer and the second electrode layer;
   an optical lens disposed on a surface of the first electrode layer, wherein the surface is away from the first dielectric layer; and
   a second dielectric layer disposed on the second electrode layer and the second electrode layer located between the first dielectric layer and the second dielectric layer, wherein either the first dielectric layer or the second dielectric layer is a color filter layer.

2. The touch panel of claim 1, wherein the first electrode layer comprises a plurality of first stripe electrode patterns arranged in parallel.

3. The touch panel of claim 2, wherein the second electrode layer comprises a plurality of second stripe electrode patterns arranged in parallel, and a direction in which the second stripe electrode patterns are arranged is substantially perpendicular to a direction in which the first stripe electrode patterns are arranged.

4. The touch panel of claim 1, further comprising a substrate, wherein the first electrode layer is disposed on the substrate, the color filter layer comprises a plurality of color filter films and a black matrix defining a plurality of sub-pixel areas on the substrate, and each of the color filter films is located within one of the sub-pixel areas.

5. The touch panel of claim 4, wherein an overlapping area between the first electrode layer and the second electrode layer covers two or more sub-pixel areas.

6. The touch panel of claim 5, wherein the color filter films comprise red filter films, green filter films or blue filter films.

7. The touch panel of claim 1, further comprising a passivation layer disposed between the second electrode layer and the second dielectric layer.

8. The touch panel of claim 7, further comprising a grounding conductive layer disposed between the passivation layer and the second dielectric layer.

9. The touch panel of claim 1, further comprising a planar layer disposed on a surface of the color filter layer, wherein the surface is away from the first electrode layer.

10. The touch panel of claim 1, wherein a material of the first electrode layer and the second electrode layer comprises a transparent conductive material composed of indium tin oxide (ITO) or indium zinc oxide (IZO).

11. The touch panel of claim 1, wherein the first dielectric layer comprises a glass substrate or a plastic substrate.

12. A liquid crystal display (LCD) panel, comprising:
    a first substrate, comprising:
      a first electrode layer;
      a second electrode layer disposed above the first electrode layer;
      a first dielectric layer disposed between the first electrode layer and the second electrode layer;
      an optical lens disposed on a surface of the first electrode layer, wherein the surface is away from the first dielectric layer;
      a second dielectric layer disposed on the second electrode layer and the second electrode layer located between the first dielectric layer and the second dielectric layer, wherein either the first dielectric layer or the second dielectric layer is a color filter layer; and
      a third electrode layer completely covering the second dielectric layer;
    a second substrate parallel to the first substrate; and
    a liquid crystal layer disposed between the third electrode layer of the first substrate and the second substrate.

13. The LCD panel of claim 12, wherein the first electrode layer comprises a plurality of first stripe electrode patterns arranged in parallel.

14. The LCD panel of claim 13, wherein the second electrode layer comprises a plurality of second stripe electrode patterns arranged in parallel, and a direction in which the second stripe electrode patterns are arranged is substantially perpendicular to a direction in which the first stripe electrode patterns are arranged.

15. The LCD panel of claim 12, further comprising a substrate, wherein the first electrode layer is disposed on the substrate, the color filter layer comprises a plurality of color filter films and a black matrix defining a plurality of sub-pixel areas on the substrate, and each of the color filter films is located within one of the sub-pixel areas.

16. The LCD panel of claim 15, wherein an overlapping area between the first electrode layer and the second electrode layer covers two or more sub-pixel areas.

17. The LCD panel of claim 15, wherein the color filter films comprise red filter films, green filter films or blue filter films.

18. The LCD panel of claim 12, further comprising a passivation layer disposed between the second electrode layer and the second dielectric layer.

19. The LCD panel of claim 18, further comprising a grounding conductive layer disposed between the passivation layer and the second dielectric layer.

20. The LCD panel of claim 12, further comprising a planar layer disposed on a surface of the color filter layer, wherein said surface is away from the first electrode layer.

21. The LCD panel of claim 12, wherein a material of the first electrode layer, the second electrode layer, and the third electrode layer comprises a transparent conductive material composed of ITO or IZO.

22. The LCD panel of claim 12, wherein the second substrate comprises an active device array structure.

23. The LCD panel of claim 12, wherein the first dielectric layer comprises a glass substrate or a plastic substrate.

* * * * *